United States Patent [19]

Shabrang

[11] Patent Number: 4,707,224
[45] Date of Patent: Nov. 17, 1987

[54] DEVICE AND METHOD FOR FLUORINATING COMPOUNDS

[75] Inventor: Mani Shabrang, Midland, Mich.

[73] Assignee: The Dow Chemical Company, Midland, Mich.

[21] Appl. No.: 924,952

[22] Filed: Oct. 30, 1986

[51] Int. Cl.$^4$ .............................................. C25B 1/00
[52] U.S. Cl. ..................................... 204/1 T; 204/101; 204/421; 204/424; 204/427; 429/33; 429/191; 260/694
[58] Field of Search ............... 204/1 T, 1 S, 421, 424, 204/427, 101; 429/33, 191; 260/694

[56] References Cited

U.S. PATENT DOCUMENTS

| | | | |
|---|---|---|---|
| Re. 28,792 | 4/1976 | Ruka et al. | 204/1 S |
| 2,013,035 | 9/1935 | Daudt et al. | 260/162 |
| 2,447,717 | 8/1948 | Simons | 260/539 |
| 2,533,132 | 12/1950 | McBee et al. | 260/653 |
| 3,546,083 | 3/1967 | Ort et al. | 204/131 |
| 3,764,269 | 10/1973 | Oldham et al. | 204/421 |
| 4,057,676 | 11/1977 | Rao et al. | 429/50 |
| 4,263,382 | 4/1981 | Louzos et al. | 429/213 |
| 4,287,319 | 9/1981 | Phillips | 525/336 |
| 4,321,114 | 3/1982 | MacDiarmid et al. | 204/2.1 |
| 4,329,208 | 5/1982 | Vayenas et al. | 204/59 |
| 4,352,869 | 10/1982 | Mellors | 429/191 |
| 4,404,068 | 9/1983 | Huggins et al. | 204/59 |

OTHER PUBLICATIONS

S. Pancharatnam, et al., J. Electrochem. Soc., 122, (1975) 869.

Primary Examiner—R. L. Andrews
Attorney, Agent, or Firm—Joseph T. Majka; Ronald G. Brookens

[57] ABSTRACT

A method and an apparatus are described for fluorinating substances utilizing a fluoride-ion valve.

12 Claims, 6 Drawing Figures

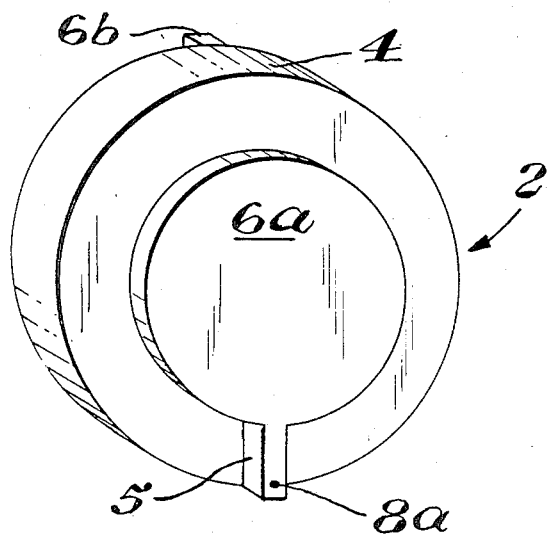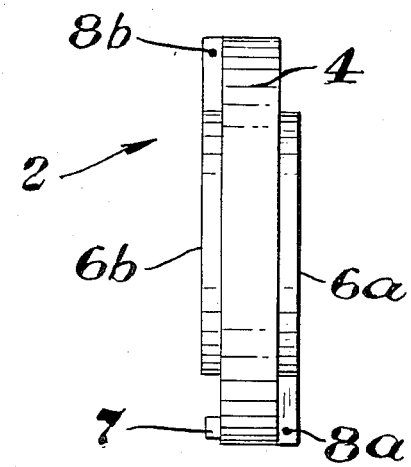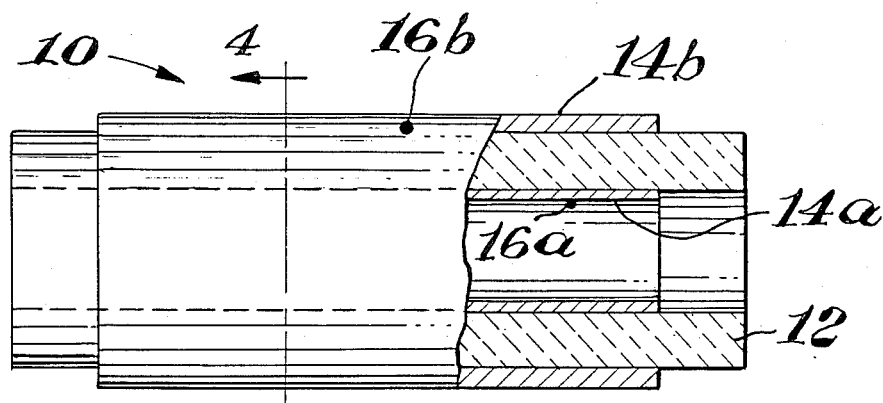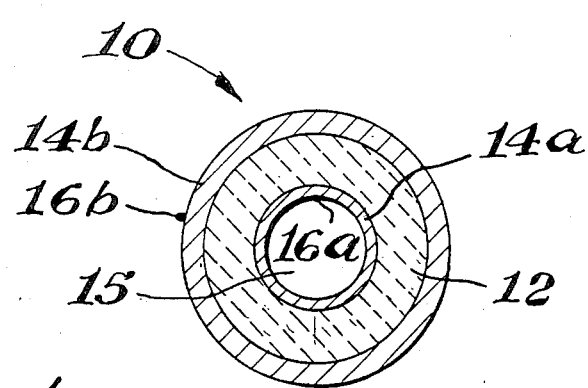

DEVICE AND METHOD FOR FLUORINATING COMPOUNDS

FIELD OF THE INVENTION

This invention relates to a device and a method for fluorinating compounds with fluorine, by slowly and precisely regulating the flow of fluorine to the compound to be fluorinated, using fluoride-ion conductors.

BACKGROUND OF THE INVENTION

Fluorine ($F_2$) is a nonmetallic element in Group VIIA of the Periodic Classification and is the most electronegative element and the most powerful oxidizing agent known. Fluorine is an intensely active substance, if not the most active element known. Fluorines reactivity allows it to combine directly with most oxidizable substances, including organic compounds. Though nonflammable, fluorine being a powerful oxidizing agent, will react violently with a wide range of both organic and inorganic compounds, frequently with ignition and/or explosion.

Processes for fluorinating substrates, i.e., organics, with fluorine ($F_2$) gas are known. For example, in one process, fluorine gas is admixed with an inert gas, and the mixture is brought directly into contact with the organic substrate to be fluorinated. This process suffers the disadvantages of high expense and the quite violent reaction. In another known process, fluorine is generated in situ at a metal source, and the fluorine thus generated is contacted with an organic reactant at low temperatures in liquefied hydrogen fluoride (HF). This process suffers the disadvantage of requiring expensive refrigeration equipment necessary to generate the low temperatures. In view of the above-noted disadvantages, and particularly in view of the difficulty in handling fluorine gas, it would be highly desirable to provide a method which permits safer and more controlled handling of fluorine gas and its use in fluorinating reactions.

SUMMARY OF THE INVENTION

In one embodiment, the present invention is directed to a method utilizing a fluoride-ion valve for fluorinating inorganic and organic compounds comprising (a) introducing fluorine to an input side of an electrically actuated fluoride-ion valve, (b) electrochemically regulating the flow of fluorine through said fluoride-ion valve to an output side of said valve, wherein said output side is in contact with a compound to be fluorinated, and (c) fluorinating said compound at said output side of said valve.

In another embodiment, the present invention is directed to a fluoride-ion conducting valve for regulating the flow of fluorine, comprising (a) a ceramic electrolyte substantially impermeable to the passage of gases other than hydrogen and permeable to the flow of fluoride-ions, and (b) a plurality of electrodes, wherein each electrode is disposed upon said ceramic electrolyte so as to induce an electrical potential across said ceramic electrolyte when voltage is applied to said electrodes.

In yet another embodiment of the present invention, there is provided an apparatus for fluorinating substances with fluorine, comprising (a) a chamber holding a source of fluorine, (b) an electrically actuated fluoride-ion valve for regulating the flow of fluorine through said valve, (c) means for communicating said fluorine source to an input side of said valve, (d) a reaction chamber communicating with an output side of said valve and which can hold a substance to be fluorinated, (e) means for recovering a fluorinated substance from said reaction chamber, and (f) voltage means for actuating said valve.

The above embodiment may further comprise (g) circulating means communicating with said reaction chamber for recycling any unreacted substance.

Other features of the present invention may include (h) heater means for heating the reaction chamber, (i) means for measuring the temperature of the reactant in the reaction chamber, and (j) an electrode situated proximate to said fluoride-ion valve to stabilize the electrochemical potential at the said electrode.

The apparatus and method of the present invention has the advantage of controlling or reducing the violent reactions of fluorine with other substrates. Another advantage is the improved safety in handling derived from the enhanced control over reactions with fluorine. And still yet another advantage is the improved control of temperatures needed to regulate the reaction of fluorine with substances to be fluorinated.

BRIEF DESCRIPTION OF THE DRAWINGS

FIGS. 1 & 2 depict partial and side views of fluoride-ion valve 2.

FIG. 4 depicts a tube-shaped fluoride-ion valve 10.

FIG. 5 depicts a cross-sectional view of the tube-shaped fluoride-ion valves in FIG. 4.

DETAILED DESCRIPTION OF THE DRAWINGS

Figure 6:
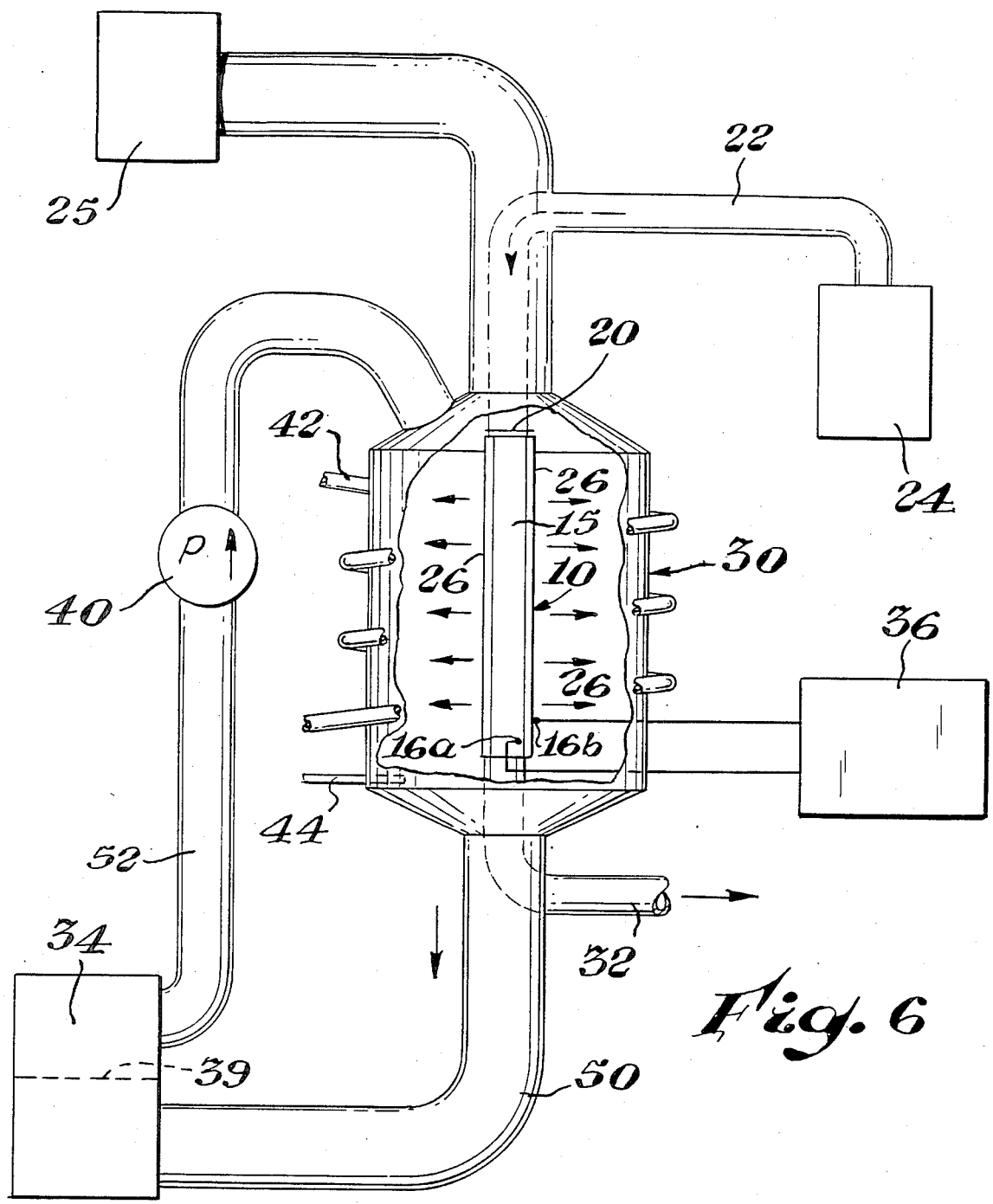
FIG. 6 depicts an apparatus for fluorinating substance utilizing the tube-shaped fluoride-ion valve in FIGS. 4 or 5.

Turning to the drawings, in FIG. 1 is shown a partial side view of a disk-shaped fluoride-ion valve 2, which consists of ceramic electrolyte 4 partially coated on one side with electrode 6a and on the opposite side with electrode 6b. Neck 5 extends from electrode 6a to the edge of electrolyte 4. Neck 5 serves as a location on electrode 6a for attachment of electrical leads to point 8a.

In FIG. 2 is shown a side view of fluoride-ion valve 2 in which the ceramic electrolyte 4 is coated on one side with a first electrode 6a and on the other side with a second electrode 6b. Points 8a and 8b represent locations on electrodes 6a and 6b, respectively, where electrical leads can be attached to receive the requisite voltage or current from a voltage or current source for electronically actuating fluoride-ion valve 2. Optionally, a third electrode 7 can be situated proximate to the second electrode 6b to stabilize the electrochemical potential at the second electrode.

Figure 3:
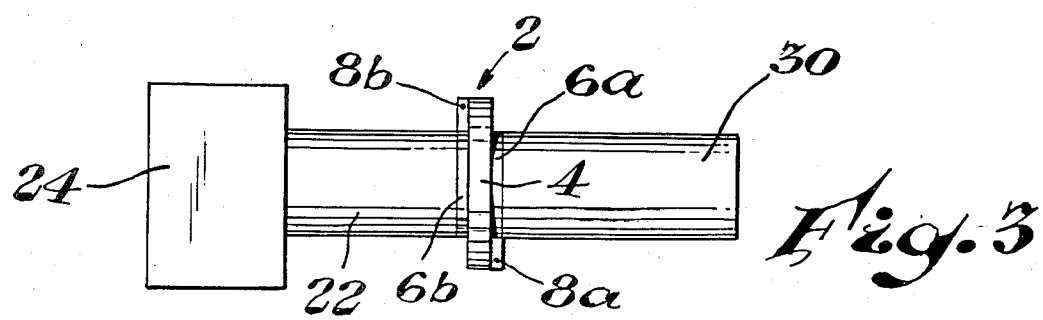
FIG. 3 depicts an apparatus for fluorinating substance using the fluoride-ion valve of FIGS. 1 or 2.

In FIG. 3 is shown an apparatus for fluorinating substances with fluorine using disk-shaped fluoride-ion valve 2. Fluorine from a chamber holding fluorine source 24 is fed to the surface of first electrode 6b of fluoride-ion valve 2 via communicating means 22, here, a tube. Upon application of the requisite voltage to points 8a and 8b on electrodes 6a and 6b, valve 2 is electrochemically actuated to transport fluorine in the form of fluoride-ion to the output surface of electrode 6a, where the fluoride-ion can reform into fluorine. The fluorine thus reformed can fluorinate a substance in reaction chamber 30.

In FIG. 4 is shown a tube-shaped fluoride-ion valve 10. Fluoride-ion valve 10 consists of a ceramic electrolyte 12 which is coated on the interior of the tube with electrode 14a and on the exterior with electrode 14b. Points 16a and 16b represent locations on electrodes 14a and 14b, respectively, where electrical leads can be attached to receive the requisite voltage or current from a voltage or current source to electronically actuate fluoride-ion valve 10. Points 16a and 16b can be located at any convenient location on the electrodes.

FIG. 5 shows the cross-section 4—4 of tube-shaped fluoride-ion valve 10 of FIG. 4, wherein the interior surface of ceramic electrolyte 12 is coated with electrode 14a and on the exterior surface with electrode 14b. The hollow interior 15 of valve 10 serves as a conduit for fluorine to contact electrode 14a.

In FIG. 6 is shown an apparatus for fluorinating substances with fluorine and utilizing the tubular fluoride-ion valve 10 described hereinbefore. Input side 20 leading to hollow interior 15 within valve 10 is connected with a chamber 24 holding a fluorine source through communicating means 22, here, a tube. Output side 26 along the length of valve 10 is connected to reaction chamber 30 holding the substance to be fluorinated and supplied by reactant source 25. Unionized fluorine is siphoned off through siphon 32. The substance fluorinated in reactant chamber 30 is recovered via communicating means 50 to recovery means 34 where the desired fluorinated product is separated from the unreacted substance via separation means 39. Voltage means 36 is provided to fluoride-ion valve 10 via points 16a and 16b in order to electrochemically actuate valve 10. A circulating means 40 in the form of a pump communicates with reaction chamber 30 and circulates any unreacted substance from chamber 34 via communicating means 52 to the output side 26 of valve 10 for further fluorination. Heater means 42 in the form of a tape or coil is provided to heat the contents of reactant chamber 10 to facilitate reaction of the substance in chamber 10 with fluorine. Alternatively, heater means 42 can be used to increase the conductivity of fluoride-ion through said valve 10. The temperature of the substances in chamber 10 can be monitored with temperature measuring means 44, for example, a thermocouple.

Having described the apparatus of the present invention, the operation of said apparatus proceeds as follows.

Substance source 25 feeds a substance to be fluorinated into reaction chamber 30 and contacts tube-shaped fluoride-ion valve 10. Fluorine gas from chamber 34 holding the fluorine source is fed to input side 20 of valve 10 through tube 22. If no voltage or current is applied to the electrodes 14a and 14b via points 16a and 16b, the fluorine will remain within the interior 15 of valve 10. Upon application of the requisite voltage or current from voltage means 36, valve 10 is electrochemically actuated to transport fluorine in the form of fluoride to the surface of electrode 14b or output side 26, where the fluoride will reform into fluorine. The fluorine thus reformed can fluorinate the substances in chamber 30 and the fluorinated substance is recovered in recovery chamber 34. Circulating pump 40 replenishes the unreacted substance to said fluorine valve 10.

The ceramic electrolyte is a solid electrolyte which is substantially impermeable to the passage of gases other than hydrogen but permeable to fluoride-ions. The ceramics which can be advantageously employed in preparing the valve are of the formula

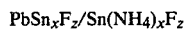

$PbSn_xF_z/Sn(NH_4)_xF_z$ wherein x is an integer from 0 to 1, preferably x is 1 and z is an integer from 2 to 4, preferably z is 4. The ceramic electrolyte preferably is substantially resistant to reaction with fluorine, although this corrosion resistance is not critical to performing the invention.

Representative ceramics useful in preparing the fluorine valves include lead perfluorostannate $PbSnF_4$, and lead fluoride $PbF_2$, preferably lead perfluorostannate.

Preferably, the valve is disk-shaped, but other shapes may be advantageously employed including valves which are tube-shaped.

The ceramic should be impenetrable to physical passage of the fluorine through the ceramic when no voltage or current has been applied to the fluoride-ion valve. Generally, the ceramic can have specific electrical conductivity ranging from $10^{-3}$ ohms$^{-1}$/cm$^{-1}$ or more. Generally, the higher the conductivity, the more efficient the valve.

Electrodes are compounds or elements coated onto the ceramic electrolyte to effect polarization of the ceramic electrolyte. Electrodes or electronic conductors which may be advantageously employed in preparing the fluorine valve include conductors which are generally of metals from Group IVB, IIIB or IIA of the Periodic Table, such as gold, nickel or alloys thereof. The electrodes should induce sufficient conductivity of the electrolyte to transport fluoride-ion at temperatures at or below about 100° C.

The electrodes can be coated to the ceramic electrolyte by evaporating or sputtering the electrode onto the ceramic electrolyte. Such methods are well known to those skilled in the art and are described by R. F. Bunshah et al., "Deposition Technologies for Films & Coatings", 1982, Noyes Publication.

The substance to be fluorinated can be an organic or inorganic compound, preferably an inorganic compound, most preferably iodide ion. During fluorination, the substance to be fluorinated can be maintained in a solid or vaporous state. The substance may be also maintained in a liquid state by itself or admixed with a suitable inert solvent. Suitable inert solvents include fluorocarbon oils.

The term, "a source of fluorine" is intended to include but is not limited to any inorganic source which can yield fluorine or fluoride-ions. Representative sources of fluorine include, for example, hydrogen fluoride (HF), metal fluorides such as potassium fluoride (KF), cobalt trifluoride ($CoF_3$) and fluorine gas, preferably fluorine gas. The source of fluorine can be maintained in either dissolved or undissolved form.

The application of electrical potential across the ceramic electrolyte via the electrodes is believed to induce the dissociation of fluorine to fluoride-ion at the cathode or the negative electrode. This reaction is described by the following set of formulas, in the situation where the source of fluorine is fluorine gas:

At the cathode: $F_2 + e^- \rightarrow 2F^-$ (from the fluorine source electrode across the ceramic electrolyte)

At the anode: $2F^- - 2e^- \rightarrow F_2$ (from the ceramic electrode electrolyte into the reaction chamber).

EXAMPLE 1

Preparation of Fluoride-Ion Conducting Valve a. Preparation of Ceramic PbSnF$_4$ Electrolyte To a flask containing 1500 ml boiling deionized water is dissolved 500 g (3.19 moles) SnF$_2$ granules (99.9 percent purity), forming a turbid solution in the boiling water. The solution is filtered and the greenish-grey precipitate is discarded. Nitrogen gas is bubbled through the hot filtrate. A saturated solution of lead nitrate is prepared by dissolving 260 g Pb(NO$_3$)$_2$ (0.78 moles) in 300 mls of boiling water. The lead nitrate solution is added dropwise to the tin fluoride solution with vigorous stirring. A white precipitate begins to form which soon turns the tin fluoride solution into a heavy white slurry when the last drops of lead nitrate are added. The precipitate is filtered hot and washed with cold water several times. The filtrate produces another batch of fine precipitate upon cooling which are added to the main batch. The precipitate is dried in vacuum oven at 50° C. overnight, forming white crystals. Analysis of the white crystals by X-ray diffraction indicated the crystals to be PbSnF$_4$. The dried crystals are slurried with acetone and the slurry is ball milled for 45 minutes in polyethylene jars using stainless steel balls. The acetone-PbSnF$_4$ slurry is decanted and dried to a powder in a vacuum oven at room temperature. The powder is uniformly dispersed inside a stainless steel die and pressed to 10,000–12,000 pounds per square inch (psi). The resultant pellet is placed in a resinous tubing and the tube evacuated. The tubing is isostatically pressed to 45,000–50,000 psi and three disks having the following properties are obtained.

| Ingot | Weight (g) | Height (mm) | Area (Cm$^2$) | Volume (cm$^3$) | Actual Density (g/cm$^3$) | Theoretical Density (g/cm$^3$) | Actual/density Theoretical density (Percent) |
|---|---|---|---|---|---|---|---|
| A | 24.27 | 0.95 | 4.75 | 4.51 | 5.38 | 6.65 | 81 |
| B | 24.93 | 1.00 | 4.75 | 4.75 | 5.25 | 6.65 | 79 |
| C | 5.30 | 0.72 | 1.31 | 0.94 | 5.64 | 6.65 | 85 |

The yield of PbSnF$_4$ from Pb(NO$_3$)$_2$ and SnF$_2$ based upon ingots formed is 49.5 percent. The pellets are then placed in a Lucite ® (trademark of DuPont Co., Wilmington, Del.) resin powder and are isostatically pressed at 150° C. for 30 minutes in order to further densify the pellets. This yields a dense disk substantially impermeable to the passage of gases but permable to the passage of fluoride-ions. The dense disk is used as the fluoride-ion valve.

b. Coating of Gold Electrode Upon PbSnF$_4$ Electrolyte

The surface of the disk thus prepared is cleaned with acetone and the disk is masked to expose a portion of electrolyte 4 such as shown in FIG. 1. The masked disk assembly is placed in a sputtering unit and gold is sputtered at 100 angstroms/min for 10 minutes until a surface layer of gold 2000 angstroms in thickness is built up, using Unit E5200 (Polaron Equipment Ltd.), a sputtering unit for rendering electron microscopy samples conductive. The disk and mask assembly thus coated is removed and placed in a bell jar under a pressure of 0.01 microns ($\mu$). Approximately 5000 angstroms of gold is evaporated on the assembly. The procedures described hereinabove are performed on the opposite side of the solid electrolyte disk to form the second electrode.

The disks as prepared are shown to have, using impedance spectroscopy, a specific conductivity of $1.5 \times 10^{-3}$ ohm$^{-1}$ (cm)$^{-1}$ at room temperature. The specific conductivity is found to increase about $2.3 \times 10^{-2}$ ohm$^{-1}$ cm$^{-1}$ when the temperature is increased to 100° centigrade (°C.). The activation energy is measured to be between 0.13 to 0.15 electron volts (ev), as determined using conventional temperature dependence measurements.

EXAMPLE 2

Fluorination of Iodide with Fluoride-ion Valve

A 1×1 inch tissue paper is soaked in a 10 percent aqueous potassium iodide solution. The paper is dried in dry nitrogen. The dried paper is contacted with the reactant side of the fluoride-ion valve depicted in FIGS. 2 and 3. Equivalent of 1.78 coulombs of charge is passed through the valve. The brown color of the iodine forms on the paper according to the following reaction:

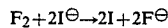

$$F_2 + 2I^\ominus \rightarrow 2I + 2F^\ominus$$

The shape of the brown mark is the same as the shape of the gold electrode on the reactant side of the valve, indicating passage of fluoride-ion through the valve and reaction of the reformed fluorine with the iodide on the paper.

I claim:

1. A method for fluorinating compounds, comprising
   (a) introducing fluorine to an input side of an electrochemically actuated fluoride-ion valve,
   (b) electrochemically regulating the flow of fluorine through said fluoride-ion valve to an output side of said valve by means of an external voltage, wherein said output side is in contact with a compound to be fluorinated, and
   (c) fluorinating said compound at said output side of said valve.

2. An electronically actuated fluoride-ion valve for regulating the flow of fluorine, through said valve comprising
   (a) a ceramic electrolyte substantially impermeable to the passage of fluorine gas and permeable to the flow of fluoride-ions, and
   (b) a plurality of electrodes, wherein each electrode is disposed upon said ceramic electrolyte so as to induce an electrical potential across said ceramic electrolyte when voltage is applied to said electrodes.

3. An apparatus for fluorinating substances with fluorine, comprising (a) a chamber holding a source of fluorine,
(b) an ellectrochemically actuated fluoride-ion valve for regulating the flow of fluorine through said valve,
(c) means for communicating said chamber holding the fluorine source to an input side of said valve,
(d) a reaction chamber communicating with an output side of said valve and holding a substance to be fluorinated,
(e) means for recovering a fluorinated substance from said reaction chamber, and
(f) voltage means for electrochemically actuating said valve.

4. The apparatus of claim 3 further comprising
(g) pump means communicating with said (d) reaction chamber for circulating any unreacted substance to the output side of said valve.

5. The apparatus of claim 4 further comprising
(h) heater means for heating the reaction chamber,
(i) means for measuring the temperature of the reactant in the reaction chamber, and
(j) an electrode situated proximate to said fluoride-ion valve to stabilize the electrochemical potential at the said valve.

6. The valve of claim 2 wherein the electrolyte is lead perfluorostannate.

7. The method of claim 1 wherein said valve is disk-shaped.

8. The method of claim 1 wherein said valve is tube-shaped.

9. The valve of claim 2 which is disk-shaped.

10. The valve of claim 2 which is tube-shaped.

11. The apparatus of claim 3 wherein said valve is disk-shaped.

12. The apparatus of claim 3 wherein said valve is tube-shaped.

* * * * *